(12) United States Patent
Elija et al.

(10) Patent No.: US 12,291,158 B2
(45) Date of Patent: May 6, 2025

(54) AIRBAG MODULE OF A VEHICLE PASSENGER RESTRAINT SYSTEM

(71) Applicant: ZF AUTOMOTIVE GERMANY GMBH, Alfdorf (DE)

(72) Inventors: Daniel Elija, Schwabisch Gmünd (DE); Werner Freisler, Schwabisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/250,758

(22) PCT Filed: Oct. 28, 2021

(86) PCT No.: PCT/EP2021/079930
§ 371 (c)(1),
(2) Date: Apr. 27, 2023

(87) PCT Pub. No.: WO2022/090366
PCT Pub. Date: May 5, 2022

(65) Prior Publication Data
US 2023/0391285 A1    Dec. 7, 2023

(30) Foreign Application Priority Data

Oct. 28, 2020   (DE) .................. 10 2020 128 335.0

(51) Int. Cl.
*B60R 21/217*   (2011.01)
*B60R 21/206*   (2011.01)
(Continued)

(52) U.S. Cl.
CPC ........ *B60R 21/206* (2013.01); *B60R 21/2171* (2013.01); *B60R 21/2176* (2013.01); *B60R 21/2342* (2013.01); *B60R 2021/23169* (2013.01)

(58) Field of Classification Search
CPC ............. B60R 21/206; B60R 21/2171; B60R 21/2176; B60R 21/2342; B60R 2021/23169; B60R 21/201
See application file for complete search history.

(56) References Cited

U.S. PATENT DOCUMENTS 5,931,493 A * 8/1999 Sutherland ............ B60R 21/215
280/753
6,099,027 A * 8/2000 Shirk .................... B60R 21/216
280/731
(Continued)

FOREIGN PATENT DOCUMENTS

DE          69505724 T2     11/1995
DE          10160192 A1     6/2003
(Continued)

OTHER PUBLICATIONS

PCT Search Report for corresponding International Application Serial No. PCT/EP2021/079930, dated Jan. 12, 2022, pp. 1-5.

*Primary Examiner* — Karen Beck
(74) *Attorney, Agent, or Firm* — Tarolli, Sundheim, Covell & Tummino LLP

(57) ABSTRACT

The invention relates to an airbag module (10) of a vehicle occupant restraint system, specifically a knee airbag module, comprising a folded inflatable airbag (12) for restraining a vehicle occupant, a module housing (14) which includes a flexible airbag sheath (16) at least partially enclosing the folded airbag (12), and comprising a module cover (18) which includes fasteners (20) for fastening the module cover (18) to the module housing (14), wherein the flexible airbag sheath (16) of the module housing (14) is fixed directly to said fasteners (20), and wherein at least one flexible anchoring element (22, 22') is provided which extends between the
(Continued)

folded airbag (12) and the module cover (18) and limits or prevents expansion of the folded airbag (12) toward the module cover (18).

16 Claims, 4 Drawing Sheets

(51) Int. Cl.
*B60R 21/2342* (2011.01)
*B60R 21/231* (2011.01)

(56) References Cited

U.S. PATENT DOCUMENTS

| | | | |
|---|---|---|---|
| 6,364,351 B1 | 4/2002 | Hier et al. | |
| 6,371,510 B1* | 4/2002 | Marriott | B60R 21/217 |
| | | | 280/733 |
| 6,435,554 B1* | 8/2002 | Feldman | B60R 21/231 |
| | | | 280/743.2 |
| 2007/0007753 A1* | 1/2007 | Williams | B60R 21/217 |
| | | | 280/728.2 |
| 2011/0193328 A1* | 8/2011 | Fukawatase | B60R 21/206 |
| | | | 280/730.2 |
| 2017/0129443 A1* | 5/2017 | Elija | B60R 21/215 |
| 2019/0299920 A1* | 10/2019 | Ozeki | B60R 21/201 |

FOREIGN PATENT DOCUMENTS

| | | |
|---|---|---|
| DE | 102010002247 A1 | 10/2010 |
| DE | 102016001456 A1 | 8/2017 |
| DE | 112015002940 B4 | 9/2017 |
| DE | 102017103827 A1 | 8/2018 |
| EP | 2340969 A1 | 6/2013 |
| EP | 3168089 A1 | 5/2017 |

\* cited by examiner

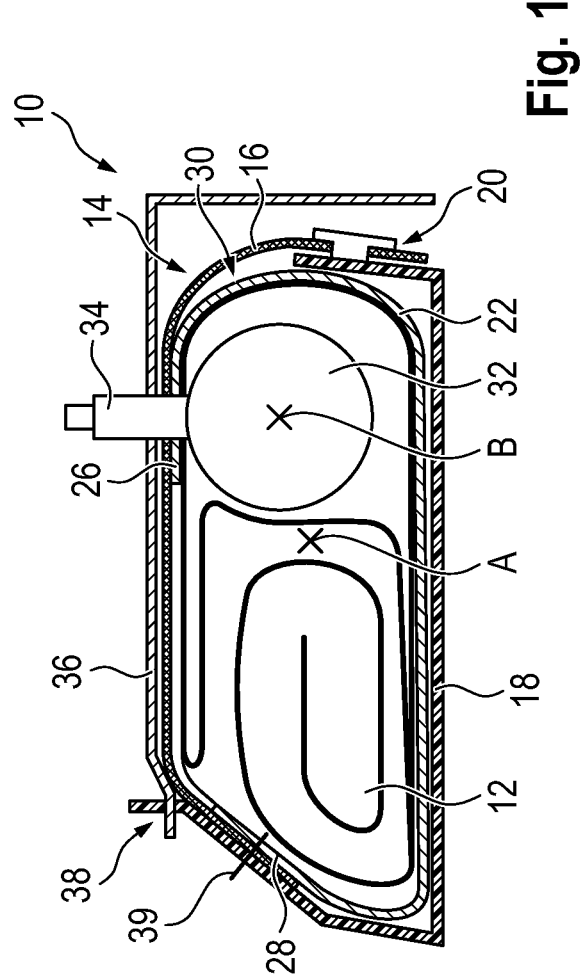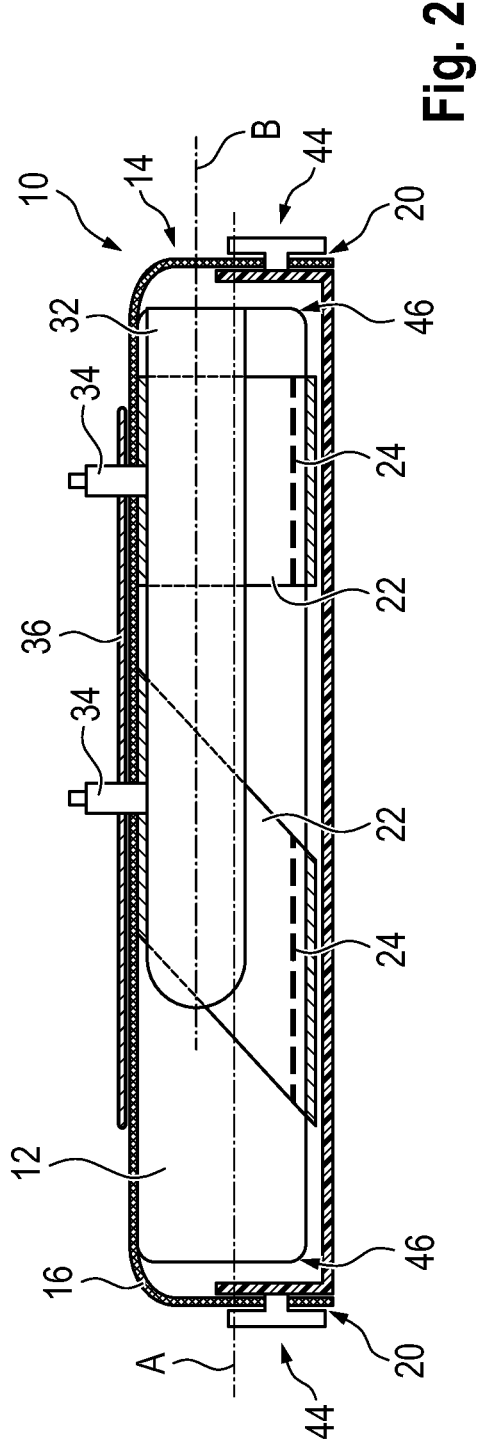

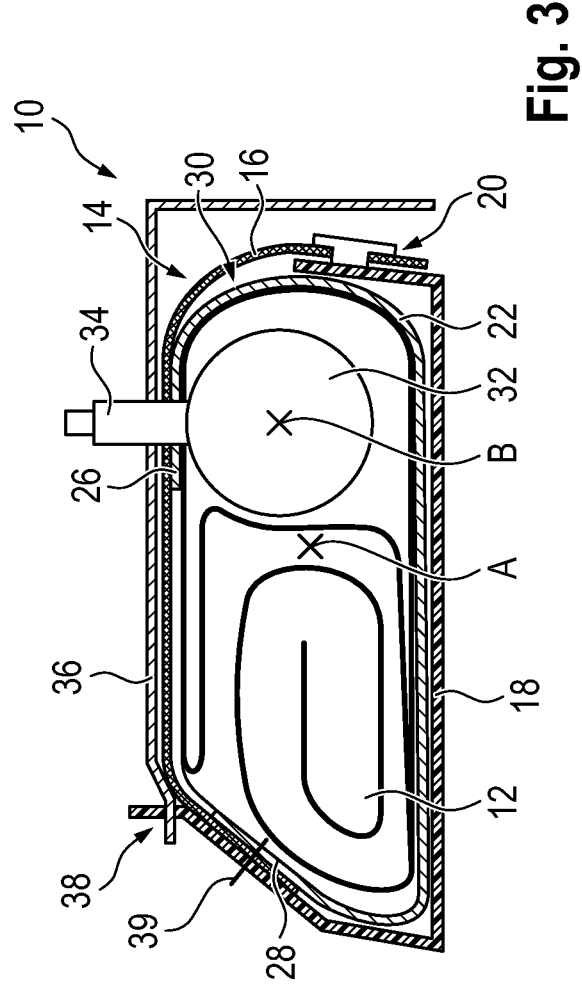
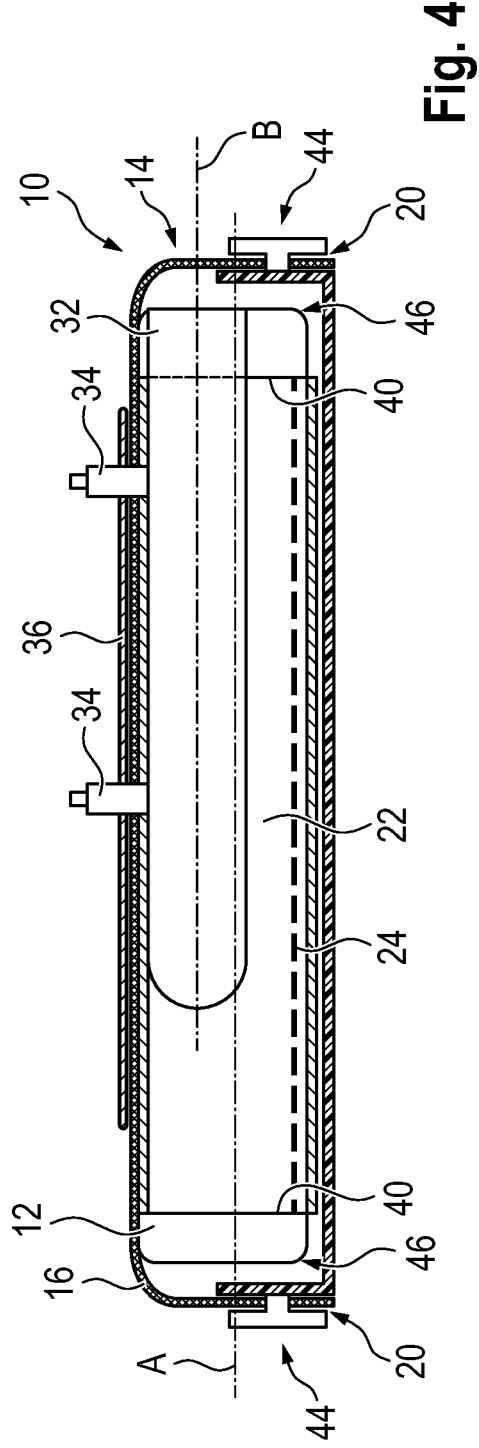

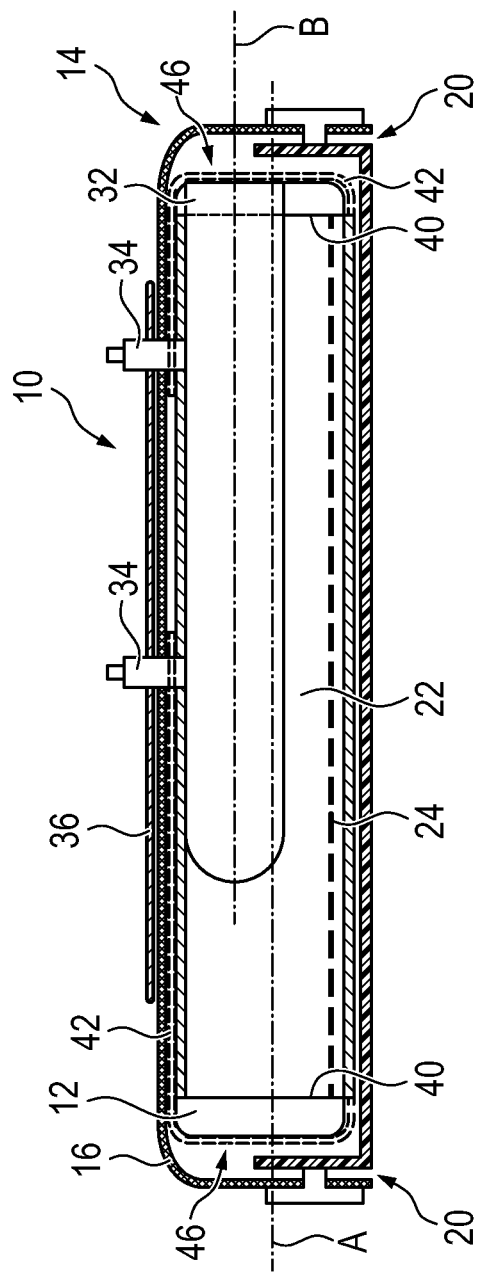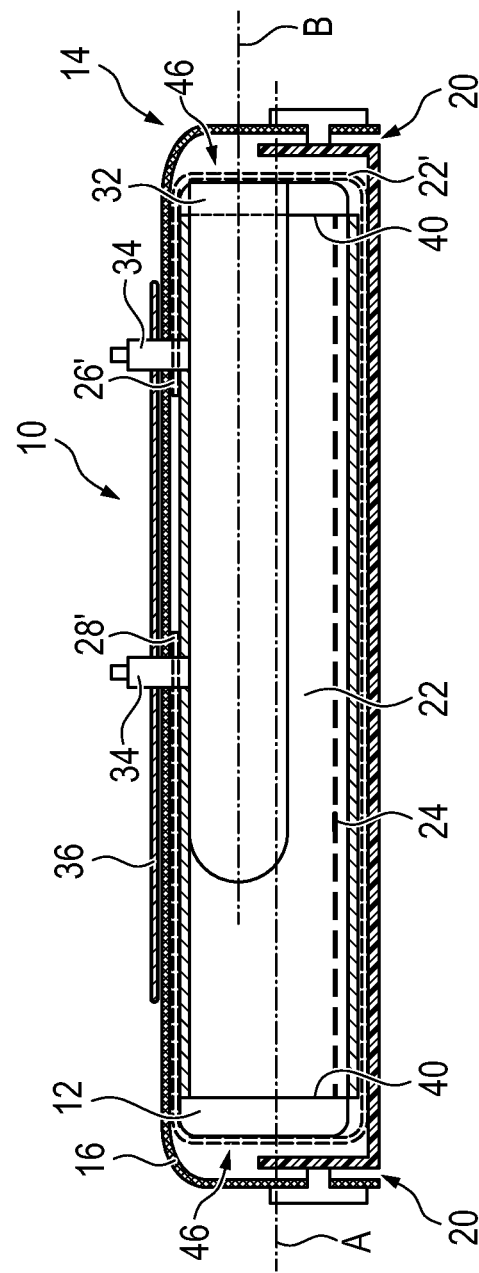

AIRBAG MODULE OF A VEHICLE PASSENGER RESTRAINT SYSTEM

RELATED APPLICATIONS

This application is a U.S. National Stage Application filed under 35 USC 371 claiming priority to Serial No. PCT/EP2021/079930, filed on 28 Oct. 2021; which claims priority from German Patent Application DE 10 2020 128 335.0, filed 28 Oct. 2020, the entireties of which are hereby incorporated herein by reference.

TECHNICAL FIELD

The invention relates to an airbag module of a vehicle occupant restraint system, specifically a knee airbag module, comprising a folded inflatable airbag for restraining a vehicle occupant, a module housing which includes a flexible airbag sheath at least partially enclosing the folded airbag, as well as a module cover which includes fasteners for fastening the module cover to the module housing, the flexible airbag sheath of the module housing being directly fixed to said fasteners.

BACKGROUND

Airbag modules are constituents of vehicle occupant restraint systems and are used to protect vehicle occupants in particular vehicle situations. To put it simply, the vehicle occupant restraint system includes a controller and an airbag module comprising an inflator and an airbag. The controller decides by way of preset parameters whether a situation is given in which the inflator is activated to inflate the airbag.

Knee airbag modules protect the vehicle occupant in the leg region in the event of a vehicle collision and are frequently positioned below or in a lower portion of the instrument panel in the vehicle interior. When the airbag module is activated, the knee airbag deploys between the instrument panel and the legs of the vehicle occupant along the instrument panel toward the vehicle occupant. The module cover in a knee airbag module is a separate part, for example, which is disposed in a recess either in the lower portion of the instrument panel or in a cover part in the footwell of the vehicle.

Since knee airbag modules are hidden behind or below the instrument panel, it has already been considered to replace the usually provided rigid module housing at least partly with a flexible airbag sheath. In this way, the module weight as well as the space required for the module are advantageously reduced.

The document DE 11 2015 002 940 B4 already shows a generic airbag module in which the module housing is formed at least partially of a flexible fabric part and the module cover includes fasteners for fastening the module cover to the module housing.

In order to minimize the weight and the space required, the module cover in knee airbag modules is frequently made of a very thin synthetic material and has a correspondingly low inherent stiffness and stability. The airbag is compressed to form a compact airbag package and is preferably thermoset so that the airbag package remains almost dimensionally stable over a long period of time. However, over the entire service life of the occupant restraint system a certain relaxation of the airbag package may occur which causes the latter to gradually inflate and to press against the unstable module cover. As a result, the module cover is deformed and bulges in the direction of the footwell of the vehicle. This reduces the leg room of a vehicle occupant in the area of the footwell which a vehicle occupant can visually perceive as a defect.

SUMMARY

Consequently, it is the object of the invention to provide very compact airbag modules which remain largely dimensionally stable over their entire service life, however.

In accordance with the invention, this object is achieved by an airbag module of the type mentioned at the beginning in which at least one flexible anchoring element is provided which extends between the folded airbag and the module cover and limits or prevents expansion of the folded airbag toward the module cover so that no undesired deformation of the module cover will occur. Such a flexible anchoring element can be integrated in the airbag module with minimum additional effort.

Preferably, the flexible anchoring element is a film, a nonwoven or a fabric cloth, specifically made of airbag fabric. Those anchoring elements can be manufactured at extremely low cost and are largely negligible as regards the space required.

Furthermore, the at least one flexible anchoring element may include a weakened zone at which it tears up when the airbag module is activated. Said weakened zone can be realized, for example, as a linear perforation in the anchoring element. As an alternative, also a tearable nonwoven that tears up under predetermined stress is conceivable.

In one embodiment of the airbag module, a module longitudinal axis extends, in the mounted state of the airbag module, in the vehicle transverse direction, wherein the at least one flexible anchoring element is designed as at least one flexible anchoring strap which extends, in respect of the module longitudinal axis, in the circumferential direction from a first strap end at least partially around the folded airbag to a second strap end.

In said embodiment, both the folded airbag and an inflator to inflate the airbag can be accommodated in the holding space defined by the module housing and the module cover, the first strap end being fastened to the inflator, in particular to a mounting bolt of the inflator. The inflator preferably is an elongate cylindrical inflator having a cylindrical axis which extends substantially in parallel to the module longitudinal axis, wherein the inflator includes at least one mounting bolt which extends radially with respect to the module longitudinal axis through the module housing and secures the airbag module to a structure affixed to the vehicle, such as to a module holder or a body cross member. Alternatively, or additionally, to the fixation on the inflator, the first strap end may also be attached to the flexible airbag sheath.

The second strap end of the anchoring strap is preferably fastened to the module cover, specifically adjacent to a mounting portion of the module cover for mounting the airbag module on a structure affixed to the vehicle.

In particular, the second strap end may be fastened, along with an edge portion of the flexible airbag sheath, to the module cover. The fastening is implemented, for example, by a tear seam which tears open when the airbag module is activated. Furthermore, configuration variants are imaginable in which the second strap end is attached (exclusively) to the flexible airbag sheath.

According to a further embodiment of the airbag module, on the opposite side edges of the flexible anchoring element in the form of an anchoring strap there are provided strap extensions between the first strap end and the second strap end each of which extends from the anchoring strap via an adjacent axial end of the folded airbag and is fastened to the inflator.

Alternatively, or additionally, at the opposite side edges of the anchoring strap there may be provided strap extensions each of which extends from the anchoring strap to an adjacent axial end of the module cover and is fastened there. With respect to the module longitudinal axis, those strap extensions effectuate, at opposite side edges of the anchoring strap, also an anchoring in the longitudinal direction in addition to the anchoring of the folded airbag in the circumferential direction.

According to yet another embodiment of the airbag module, in the holding space defined by the module housing and the module cover both the folded airbag and an inflator to inflate the airbag are accommodated, wherein a module longitudinal axis in the installed state of the airbag module extends in the vehicle transverse direction, and wherein the at least one flexible anchoring element comprises a flexible anchoring strap which extends, with respect to the module longitudinal axis from a first strap end fixed to the inflator via an axial end of the folded airbag and an opposite axial end of the folded airbag to a second strap end fixed to the inflator. Accordingly, the strap ends are fixed specifically to one or more mounting bolts of the inflator.

BRIEF DESCRIPTION OF THE DRAWINGS

Further features and advantages of the invention will be obvious from the following description of preferred embodiments with reference to the drawings, wherein:

FIG. 1 shows a schematic section across an embodiment of an airbag module according to the invention;

FIG. 2 shows a schematic longitudinal section view of the airbag module according to FIG. 1;

FIG. 3 shows a schematic section across another embodiment of an airbag module according to the invention;

FIG. 4 shows a schematic longitudinal section view of the airbag module according to FIG. 3;

FIG. 7 shows a schematic longitudinal section view of the airbag module according to FIG. 5 in another configuration variant; and FIG. 8 shows a schematic longitudinal section view of the airbag module according to FIG. 5 in yet another configuration variant.

DESCRIPTION

Figure 5:
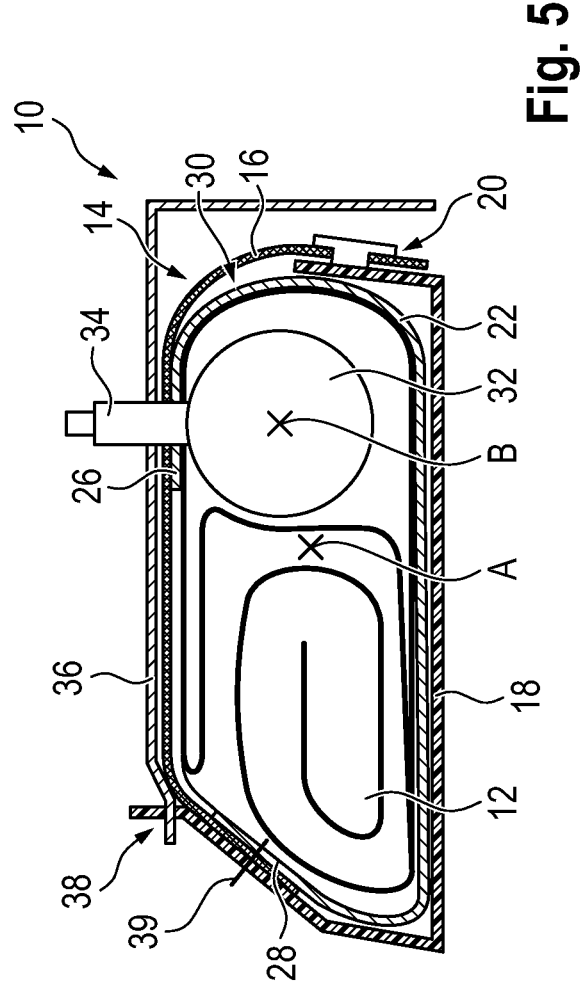
FIG. 5 shows a schematic section across another embodiment of an airbag module according to the invention.

FIGS. 1 and 8 illustrate different embodiments of an airbag module 10 for vehicle occupant restraint systems. Each of the shown airbag modules 10 is a knee airbag module 10 comprising a folded inflatable airbag 12 for restraining a vehicle occupant, a module housing 14 which has a flexible airbag sheath 16 enclosing the folded airbag 12 at least partially, as well as a module cover 18 which includes fasteners 20 for fastening the module cover 18 to the module housing 14, the flexible airbag sheath 16 of the module housing 14 being directly fixed to said fasteners 20.

The flexible airbag sheath 16 in the illustrated embodiments is a fabric part, particularly an airbag fabric part, the module housing 14 preferably consisting exclusively of the airbag sheath 16 and, thus, forming a fabric housing. Alternatively, the flexible airbag sheath 16 may be a film, a nonwoven or the like, however.

The module cover 18 preferably is a thin synthetic shell delimiting the knee airbag module 10 toward the footwell. The fasteners 20 are fastening hooks or fastening tabs, for example, and may specifically be formed integrally with the module cover 18.

The airbag module 10 moreover includes at least one flexible anchoring element 22 which extends between the folded airbag 12 and the module cover 18 and limits or prevents expansion of the folded airbag 12 toward the module cover 18. The folded airbag 12 acts only minimally upon the module cover 18 due to being restrained by the anchoring element 22, or ideally remains spaced apart completely and permanently from the module cover 18 so that no undesired deformation of the module cover 18 will occur throughout the whole service life of the vehicle occupant restraint system.

Analogously to the airbag sheath 16, the anchoring element 22 in the present module configurations is a flexible fabric cloth, specifically made of airbag fabric. Alternatively, the at least one flexible anchoring element 22 may also be made of a film or a nonwoven, however.

As is indicated in FIGS. 2, 4 and 6 to 8, the flexible anchoring element 22 has a weakened zone 24 at which it tears open when the airbag module 10 is activated, the weakened zone 24 being realized as a linear perforation of the anchoring element 22 in this case. As an alternative, for example a tearable nonwoven that tears open under a predetermined stress would also be imaginable.

In the shown embodiments, a module longitudinal axis A extends in the vehicle transverse direction in the mounted state of the airbag module 10, wherein the at least one flexible anchoring element 22 is designed as at least one flexible anchoring strap and extends, with respect to the module longitudinal axis A in the circumferential direction from a first strap end 26 at least partially around the folded airbag 12 to an opposite second strap end 28.

Both the folded airbag 12 and an inflator 32 for inflating the airbag 12 are accommodated in the holding space 30 defined by the module housing 14 and the module cover 18, the first strap end 26 being fixed to the inflator 32, specifically to a mounting bolt 34 of the inflator 32. In the present embodiments, the inflator 32 is an elongate cylindrical tubular inflator having a cylindrical axis B which extends substantially in parallel to the module longitudinal axis A. The inflator 32 comprises at least one mounting bolt 34 which extends radially with respect to the cylindrical axis B through the flexible airbag sheath 16 and fastens the airbag module 10 to a structure 36 affixed to the vehicle. The structure 36 affixed to the vehicle in the present embodiment is a module holder, but alternatively it may be a body part or the like.

The second strap end 28 is fastened to the module cover 18, specifically adjacent to a mounting portion 38 of the module cover 18 for mounting the airbag module 10 to the structure 36 affixed to the vehicle.

In particular, the second strap end 28 may be fastened, along with an edge portion of the flexible airbag sheath 16, on the module cover 18, for example by a tear seam 39 which tears open when the airbag module 10 is activated.

FIGS. 1 and 2 illustrate an embodiment of the airbag module 10 in which two separate anchoring straps offset in the axial direction are provided which limit or prevent expansion of the folded airbag 12 toward the module cover 18.

The embodiment according to FIGS. 3 and 4 differs therefrom merely by the fact that, instead of the two separate, comparatively narrow anchoring straps, only one comparatively wide anchoring strap is provided. According to FIG. 4, the width of the strap-shaped anchoring element 22 in the direction of the module axis A corresponds to at least 66%, specifically to about 90% of the axial dimension of the folded airbag 12.

Figure 6:
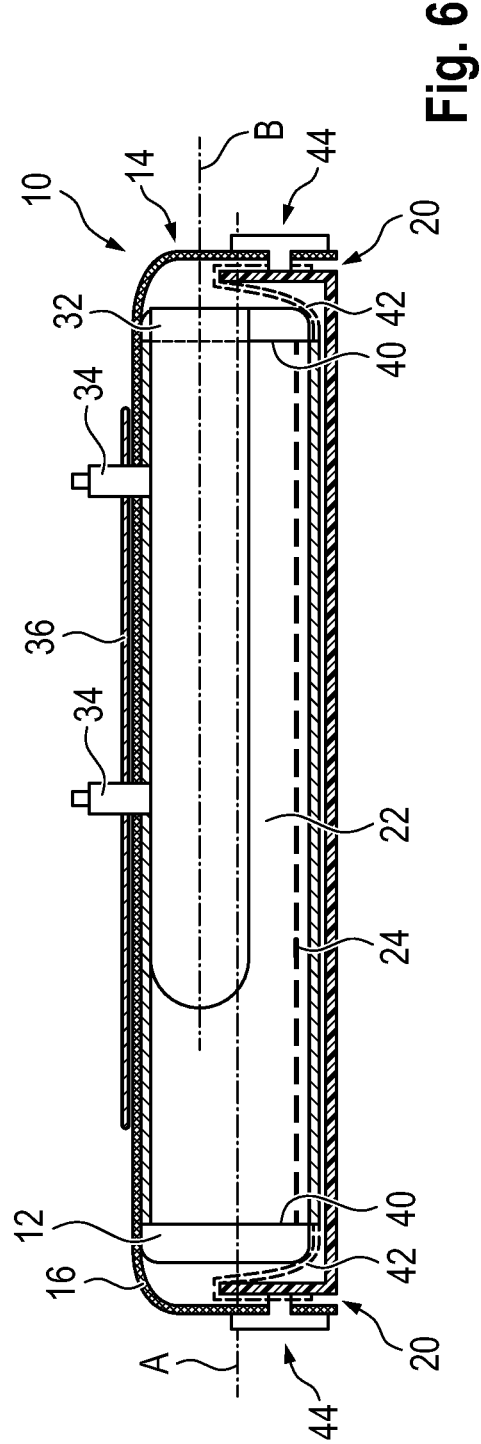
FIG. 6 shows a schematic longitudinal section view of the airbag module according to FIG. 5 in a configuration variant.

Analogously to FIGS. 1 and 3, FIG. 5 illustrates a schematic section across an airbag module 10 according to a further embodiment, while FIGS. 6 to 8 show related longitudinal section views in three different configuration variants.

In order to suppress expansion of the folded airbag 12 even more efficiently, according to FIGS. 6 and 7 strap extensions 42 (indicated by a broken line) are provided at opposite side edges 40 of a strap-shaped anchoring element 22 between the first strap end 26 and the second strap end 28, each of the strap extensions 42 extending from the anchoring element 22 either to an adjacent axial end 44 of the module cover 18 and being fastened there (FIG. 6), or extending via an adjacent axial end 46 of the folded airbag 12 and being fastened to the inflator 32. In addition to the anchoring in the circumferential direction, in this case the folded airbag 12 is also anchored via the strap extensions 42 in the axial length direction.

FIG. 8 illustrates a configuration variant of the airbag module 10 in which an anchoring element 22 according to FIG. 4 is provided.

In this case, additional anchoring of the folded airbag 12 in the axial length direction is realized by a separate strap-shaped anchoring element 22' (indicated by a broken line) which extends, with respect to the module longitudinal axis A, from a first strap end 26' fastened to the inflator 32 via an axial end 46 of the folded airbag 12 and an opposite axial end 46 of the folded airbag 12 to a second strap end 28' fastened to the inflator 32. In particular, the strap ends 26', 28' can be fastened particularly to a mounting bolt 34 of the inflator 32.

As a matter of course, in this context also configuration variants of the airbag module 10 are imaginable in which the folded airbag 12 is anchored exclusively via the anchoring element 22' in the axial length direction and specifically no anchoring element 22 is provided for anchoring the folded airbag 12 in the circumferential direction.

The invention claimed is:

1. A knee airbag module of a vehicle occupant restraint system, comprising
 a folded inflatable airbag for restraining a vehicle occupant,
 an inflator for inflating the airbag,
 a module housing comprising a flexible airbag sheath and a module cover that in combination encircle the folded airbag define a holding space in which the folded airbag and inflator are enclosed, wherein the module cover includes fasteners for fastening a first end of the module cover directly to the airbag sheath, and wherein a second end of the module cover comprises a mounting portion configured to be secured to structure affixed to the vehicle, and
 at least one flexible anchoring element that is positioned in the holding space and extends between the folded airbag and the module cover along a portion of the module cover configured to delimit the airbag module toward a footwell of the vehicle, wherein the anchoring element is secured to the airbag module adjacent the mounting portion of the module cover, and wherein the anchoring element is configured to limit expansion of the folded airbag toward the module cover prior to inflation.

2. The knee airbag module according to claim 1, wherein the flexible anchoring element is a film, a nonwoven cloth, or a fabric cloth.

3. The knee airbag module according to claim 1, wherein the at least one flexible anchoring element includes a weakened zone at which it tears open when the airbag module is activated.

4. The knee airbag module according to claim 1, wherein a module longitudinal axis in the installed state of the airbag module extends in the vehicle transverse direction, wherein the at least one flexible anchoring element is designed as a flexible anchoring strap which extends with respect to the module longitudinal axis in the circumferential direction from a first strap end at least partially around the folded airbag to a second strap end.

5. The knee airbag module according to claim 4, wherein the first strap end is fastened to the inflator.

6. The knee airbag module according to claim 4, wherein the second strap end is fastened to the module cover.

7. The knee airbag module according to claim 4, wherein the second strap end is fixed, along with an edge portion of the flexible airbag sheath, to the module cover.

8. The knee airbag module according to claim 5, wherein, on the opposite side edges of an anchoring strap between the first strap end and the second strap end, there are provided strap extensions each of which extends from the anchoring strap via an adjacent axial end of the folded airbag and is fixed to the inflator.

9. The knee airbag module according to claim 5, wherein, on the opposite side edges of an anchoring strap between the first strap end and the second strap end, there are provided strap extensions each of which extends from the anchoring strap to an adjacent axial end of the module cover and is fixed there.

10. The knee airbag module according to claim 1, wherein, in a holding space defined by the module housing and the module cover, both the folded airbag and an inflator for inflating the airbag are accommodated and a module longitudinal axis extends in the vehicle transverse direction in the mounted state of the airbag module, wherein the at least one flexible anchoring element comprises a flexible anchoring strap which extends, with respect to the module longitudinal axis, from a first strap end fixed to the inflator via an axial end of the folded airbag, the entire axial dimension of the folded airbag and an opposite axial end of the folded airbag to a second strap end fixed to the inflator.

11. The knee airbag module according to claim 2, wherein the flexible anchoring element is made of airbag fabric.

12. The knee airbag module according to claim 5, wherein the first strap end is fastened to a mounting bolt of the inflator.

13. The knee airbag module according to claim 6, wherein the second strap end is fastened to the module cover adjacent to a mounting portion of the module cover for mounting the airbag module to a structure affixed to the vehicle.

14. The knee airbag module according to claim 1, wherein the airbag sheath and the anchoring element in combination encircle at least a portion of the folded airbag.

15. The knee airbag module according to claim 14, wherein the airbag sheath covers an inflator side of the airbag and the anchoring element covers a deployment side of the airbag.

16. A knee airbag module of a vehicle occupant restraint system, comprising:

a folded inflatable airbag for restraining a vehicle occupant, a module housing which includes a flexible airbag sheath at least partially enclosing the folded airbag, and a module cover which includes fasteners for fastening the module cover to the module housing, the flexible airbag sheath of the module housing being fixed directly to said fasteners, wherein at least one flexible anchoring element is provided which extends between the folded airbag and the module cover and limits expansion of the folded airbag toward the module cover, wherein a module longitudinal axis in the installed state of the airbag module extends in the vehicle transverse direction, wherein the at least one flexible anchoring element is designed as a flexible anchoring strap which extends with respect to the module longitudinal axis in the circumferential direction from a first strap end at least partially around the folded airbag to a second strap end, wherein both the folded airbag and an inflator for inflating the airbag are accommodated in a holding space defined by the module housing and the module cover, wherein the first strap end is fastened to the inflator, and wherein, on the opposite side edges of an anchoring strap between the first strap end and the second strap end, there are provided strap extensions each of which extends from the anchoring strap to an adjacent axial end of the module cover and is fixed there.

\* \* \* \* \*